(12) United States Patent
Myung et al.

(10) Patent No.: US 11,032,558 B2
(45) Date of Patent: Jun. 8, 2021

(54) METHOD AND APPARATUS FOR PERFORMING SUPERPOSITION CODED MODULATION SCHEME IN A BROADCASTING OR COMMUNICATION SYSTEM

(71) Applicants: Samsung Electronics Co., Ltd., Suwon-si (KR); POSTECH ACADEMY-INDUSTRY FOUNDATION, Pohang-si (KR)

(72) Inventors: Seho Myung, Seoul (KR); Kyung-Joong Kim, Pohang-si (KR); Kyeong-Cheol Yang, Pohang-si (KR)

(73) Assignees: Samsung Electronics Co., Ltd., Suwon-si (KR); POSTECH ACADEMY-INDUSTRY FOUNDATION, Pohang-si (KR)

( * ) Notice: Subject to any disclaimer, the term of this patent is extended or adjusted under 35 U.S.C. 154(b) by 209 days.

(21) Appl. No.: 15/983,608

(22) Filed: May 18, 2018

(65) Prior Publication Data
US 2018/0270491 A1 Sep. 20, 2018

Related U.S. Application Data

(63) Continuation of application No. 14/546,488, filed on Nov. 18, 2014, now Pat. No. 10,015,500.

(30) Foreign Application Priority Data

Nov. 19, 2013 (KR) ........................ 10-2013-0140704

(51) Int. Cl.
*H04N 19/30* (2014.01)
*H04L 1/00* (2006.01)
(Continued)

(52) U.S. Cl.
CPC .......... *H04N 19/30* (2014.11); *H04L 1/0042* (2013.01); *H04L 1/0048* (2013.01);
(Continued)

(58) Field of Classification Search
CPC .......... H04L 25/03343; H04L 25/2601; H04L 5/0023; H04L 1/0017; H04L 1/007;
(Continued)

(56) References Cited

U.S. PATENT DOCUMENTS

2007/0195907 A1* 8/2007 Wang .................... H04L 1/0006
375/267
2007/0286238 A1* 12/2007 Wang ........................ H04L 5/04
370/478
(Continued)

FOREIGN PATENT DOCUMENTS

WO 2010/019018 A2 2/2010

OTHER PUBLICATIONS

Hugo Meric et al., Generic Approach for Hierarchial Modulation Performance Analysis: Application of DVB-Sh, Wireless Telecommunications Symposium (TS), 2011 IEEE, Apr. 13, 2011, pp. 1-6, XP031903509.
(Continued)

*Primary Examiner* — Oussama Roudani
(74) *Attorney, Agent, or Firm* — Jefferson IP Law, LLP

(57) ABSTRACT

A method and an apparatus for performing a Superposition Coded Modulation (SCM) scheme in a broadcasting or communication system including a controller are provided. The method includes controlling an SCM coefficient by the controller. The SCM coefficient is controlled according to a channel capacity of each layer of one or more layers in which information included in a signal is encoded.

3 Claims, 15 Drawing Sheets

(51) Int. Cl.
*H04L 27/34* (2006.01)
*H04L 27/18* (2006.01)

(52) U.S. Cl.
CPC ........ *H04L 1/0058* (2013.01); *H04L 27/3488* (2013.01); *H04L 27/183* (2013.01)

(58) Field of Classification Search
CPC . H04L 5/0064; H04L 27/183; H04L 27/3488; H04L 1/0003; H04L 25/03936; H04L 25/0202; H04L 27/2601; H04L 27/2604; H04L 65/607; H04L 5/0048; H04L 25/03159; H04L 2001/0098; H04L 1/0625; H04L 25/022; H04L 19/30; H04L 1/0058; H04L 1/0042; H04L 1/0048; H04W 72/04; H03M 13/356; H04N 19/33
See application file for complete search history.

(56) References Cited

U.S. PATENT DOCUMENTS

| | | | |
|---|---|---|---|
| 2009/0274225 A1* | 11/2009 | Khojastepour | H04B 7/0639 375/260 |
| 2010/0284491 A1* | 11/2010 | Chen | H04L 27/3488 375/308 |
| 2010/0296428 A1* | 11/2010 | Ho | H04H 20/42 370/312 |
| 2010/0316024 A1 | 12/2010 | Kirnan et al. | |
| 2011/0087933 A1 | 4/2011 | Varnica et al. | |
| 2011/0129025 A1* | 6/2011 | Jaeckel | H03M 13/356 375/260 |
| 2011/0222462 A1* | 9/2011 | Ho | H04L 27/3488 370/312 |
| 2011/0289382 A1* | 11/2011 | Shih | H03M 13/3707 714/763 |
| 2012/0131632 A1* | 5/2012 | Sundaresan | H04N 21/6405 725/118 |
| 2014/0362942 A1* | 12/2014 | Wood | H04L 25/067 375/267 |

OTHER PUBLICATIONS

Michael Mccloud et al., Equal Rate Multilevel Coding for the Awgn Channel, 2005 IEEE 6th Workshop on Signal Processing Advances in Wireless Communications, Jun. 2, 2005, pp. 610-614, XP010834532, Piscataway, NJ, USA.

Jing Lei et al., A Backward-Compatible Solution for Next Generation DVB-C System, IEEE International Conference on Communications, May 19, 2008, pp. 1962-1966, XP031265697, Piscataway, NJ, USA.

Meric et al., Generic Approach for Hierarchical Modulation Performance Analysis, Mar. 2011.

European Examination report dated Mar. 11, 2021, issued in European Application No. 14 193 765.6.

* cited by examiner

METHOD AND APPARATUS FOR PERFORMING SUPERPOSITION CODED MODULATION SCHEME IN A BROADCASTING OR COMMUNICATION SYSTEM

CROSS-REFERENCE TO RELATED APPLICATION(S)

This application is a continuation application of prior application Ser. No. 14/546,488, filed on Nov. 18, 2014, and was based on claimed priority under 35 U.S.C. § 119(a) of a Korean patent application filed on Nov. 19, 2013 in the Korean Intellectual Property Office and assigned Serial number 10-2013-0140704, the entire disclosure of which is hereby incorporated by reference.

JOINT RESEARCH AGREEMENT

The present disclosure was made by or on behalf of the below listed parties to a joint research agreement. The joint research agreement was in effect on or before the date the present disclosure was made and the present disclosure was made as a result of activities undertaken within the scope of the joint research agreement. The parties to the joint research agreement are 1) SAMSUNG ELECTRONICS CO., LTD. and 2) POSTECH ACADEMY-INDUSTRY FOUNDATION.

TECHNICAL FIELD

The present disclosure relates to a method and apparatus for performing a Superposition Coded Modulation (SCM) scheme in a broadcasting or communication system.

BACKGROUND

When a service provider provides content to a user in a broadcasting or communication system, the service provider needs to provide an optimum service according to a network environment and a terminal type. The service provider constructs one bit stream with video content that supports various spatial resolutions and qualities and transmits the bit stream to user terminals. Then each user terminal reproduces the video content by receiving and recovering the bit stream according to capabilities thereof. The technology of transmitting data such that content with different qualities may be provided in one bit stream in consideration of terminal types or network environments is called 'Scalable Video Coding (SVC)'.

Superposition Coded Modulation (SCM) is a technique of transmitting independent information in different layers by simply superposing the information with each other. SVC may be implemented using SCM in a broadcasting or communication system.

If SVC is implemented in an SCM system, a service provider may transmit video content suitable for a plurality of terminals having various capabilities in one stream, thereby increasing network efficiency. However, as there are more independent layers, optimizing performance with SCM is difficult. Accordingly, there is a need for efficiently maximizing the performance of an SCM scheme.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for performing a Superposition Coded Modulation (SCM) scheme in a broadcasting or communication system that implements Scalable Video Coding (SVC) using SCM.

Another aspect of the present disclosure is to provide a method and apparatus for performing an SCM scheme, which may maximize the performance of each layer, when the SCM scheme is used and a coding rate is determined for each layer of the SCM scheme in a broadcasting or communication system.

In accordance with an aspect of the present disclosure, a method for performing an SCM scheme in a broadcasting or communication system including a controller is provided. The method includes controlling an SCM coefficient by the controller. The SCM coefficient is controlled according to a channel capacity of each layer of one or more layers in which information included in a signal is encoded.

In accordance with another aspect of the present disclosure, an apparatus for performing an SCM scheme in a broadcasting or communication system is provided. The apparatus includes a controller configured to control an SCM coefficient. The controller controls the SCM coefficient according to a channel capacity of each layer of one or more layers in which information included in a signal is encoded.

In accordance with another aspect of the present disclosure, a method for processing an SCM signal in a broadcasting or communication system including a controller is provided. The method includes receiving a signal from a transmitter, performing demapping, Low Density Parity Check (LDPC) decoding, and interference cancellation on the signal in each layer of one or more layers in which information included in the signal is encoded. An SCM coefficient is controlled for the signal by the transmitter. The SCM coefficient is controlled according to a channel capacity of each layer of the one or more layers.

In accordance with another aspect of the present disclosure, an apparatus for processing an SCM signal in a broadcasting or communication system including a controller is provided. The apparatus includes a receiver configured to receive a signal from a transmitter, a controller configured to perform demapping, LDPC decoding, and interference cancellation on the signal in each layer of one or more layers in which the information included in the signal is encoded. An SCM coefficient is controlled for the signal by the transmitter. The SCM coefficient is controlled according to a channel capacity of each layer of the one or more layers.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
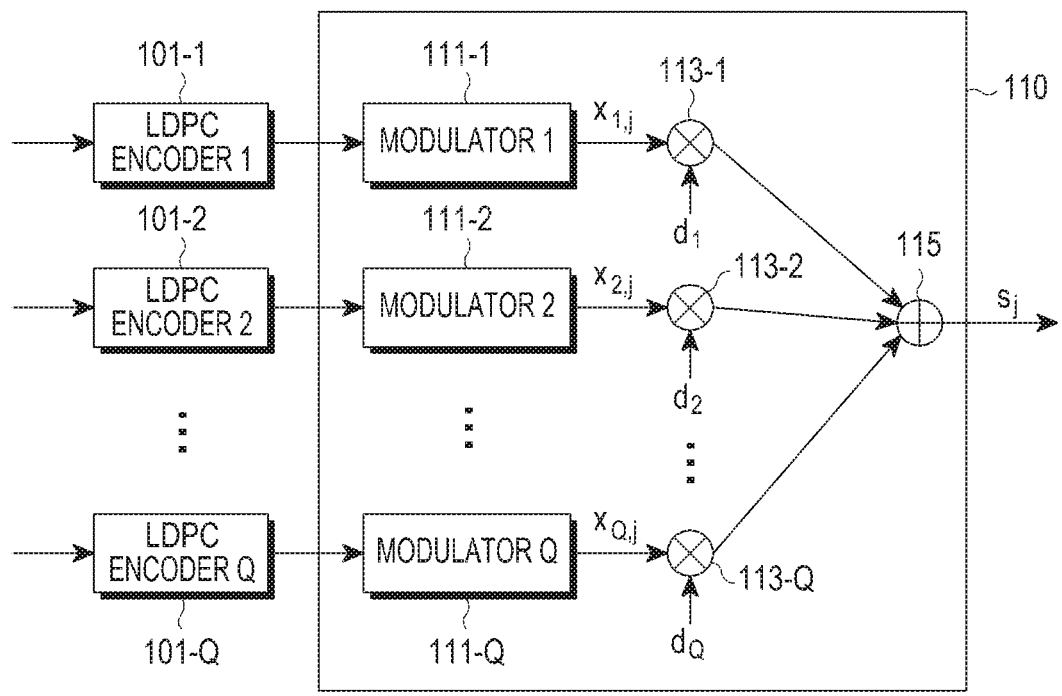
FIG. 1 is a block diagram of an Superposition Coded Modulation (SCM) encoder having Q independent layers according to an embodiment of the present disclosure.

FIG. 1 is a block diagram of a Superposition Coded Modulation (SCM) encoder having Q independent layers according to an embodiment of the present disclosure.

FIG. 1 illustrates the structure of an SCM encoder using a Low Density Parity Check (LDPC) code on the assumption of Q independent information layers according to an embodiment of the present disclosure.

Referring to FIG. 1, LDPC encoders 101-1 to 101-Q may be readily replaced with other channel encoders.

For the Q layers, an SCM encoder 110 includes Q modulators 111-1 to 111-Q and Q multipliers 113-1 to 113-Q. The LDPC encoders 101-1 to 101-Q may be configured separately from the SCM encoder 110, as illustrated in FIG. 1. Alternatively, the LDPC encoders 101-1 to 101-Q may be incorporated into the SCM encoder 110. The SCM encoder 110 may further include an adder 115 that adds a plurality of signals to generate an output for the SCM encoder 110. For example, the adder 115 may add outputs from the Q multipliers 113-1 to 113-Q.

Referring to FIG. 1, for i=1, 2, . . . , Q, a $j^{th}$ information word bit $b_{i,j}$ included in an $i^{th}$ layer is input to an $i^{th}$ LDPC encoder. Then, the $i^{th}$ LDPC encoder encodes the information word bit $b_{i,j}$ and provides the coded information bit $b_{i,j}$ to an $i^{th}$ modulator. The $i^{th}$ modulator modulates the coded information bit $b_{i,j}$ and converts the coded information bit $b_{i,j}$ to an $i^{th}$ layer signal $x_{i,j}$ corresponding to an $M_i$-ary signal constellation. Finally, a $j^{th}$ transmission symbol $s_j$ is generated by superposing $j^{th}$ modulation symbols $x_{1,j}, x_{2,j}, \ldots, x_{Q,j}$ of the respective layers by Equation 1.

$$s_j = d_1 x_{1,j} + d_2 x_{2,j} + \ldots + d_Q x_{Q,j} \quad \text{Equation 1}$$

where $d_1$ is an SCM coefficient for the ith layer signal $x_{i,j}$.

FIGS. 2A, 2B, 3A, and 3B illustrate SCM signal constellations according to an embodiment of the present disclosure.

In order to normalize power, a constraint described by Equation 2 may be imposed depending on system implementation. According to various embodiments of the present disclosure, the SCM coefficient of each layer may be controlled so that the power ratios of the layers may be equal.

$$E[|x_{1,j}|^2] = E[|x_{2,j}|^2] = \ldots = E[|x_{Q,j}|^2] = 1 \text{ and} \quad \text{Equation 2}$$

$$\sum_{i=1}^{Q} d_i^2 = 1$$

Figure 2A:
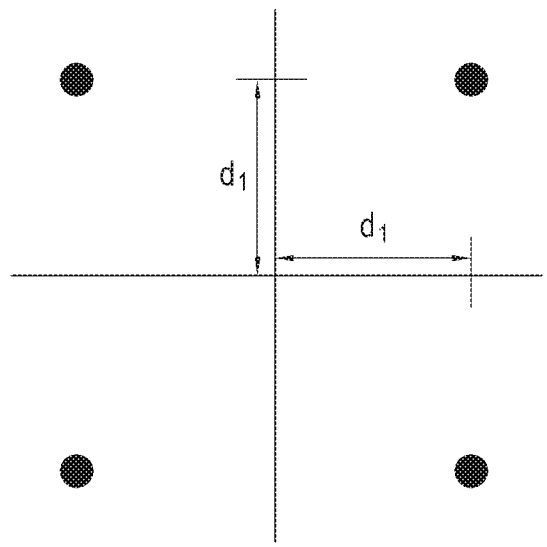
FIGS. 2A, 2B, 3A, and 3B illustrate SCM signal constellations according to an embodiment of the present disclosure.
Figure 2B:
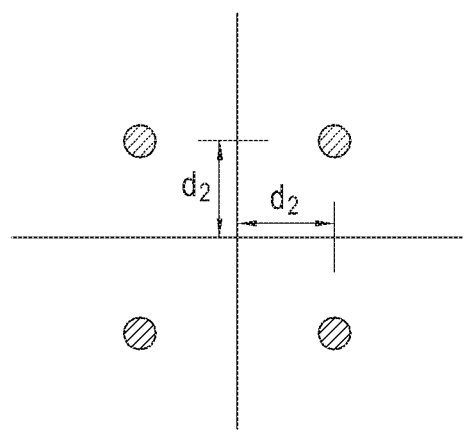

For example, SCM coefficients may be assumed to have a parameter p, and $d_1 = \sqrt{4p^2/10}$ and $d_2 = \sqrt{(5-4p^2)/10}$ are applied to two independent Quadrature Phase Shift Keying (QPSK) signals $x_{1,j}$ and $x_{2,j}$ illustrated in FIGS. 2A and 2B. A 16-ary signal constellation may be created as illustrated in FIG. 3B by combining the two independent QPSK signals illustrated in FIGS. 2A and 2B, as illustrated in FIG. 3A.

Figure 3A:
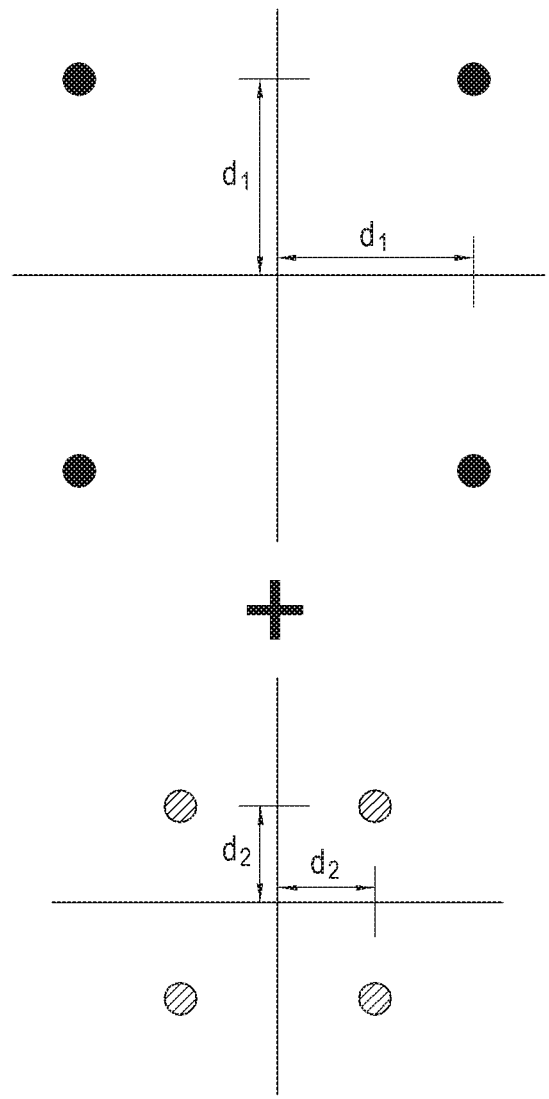
Figure 3B:
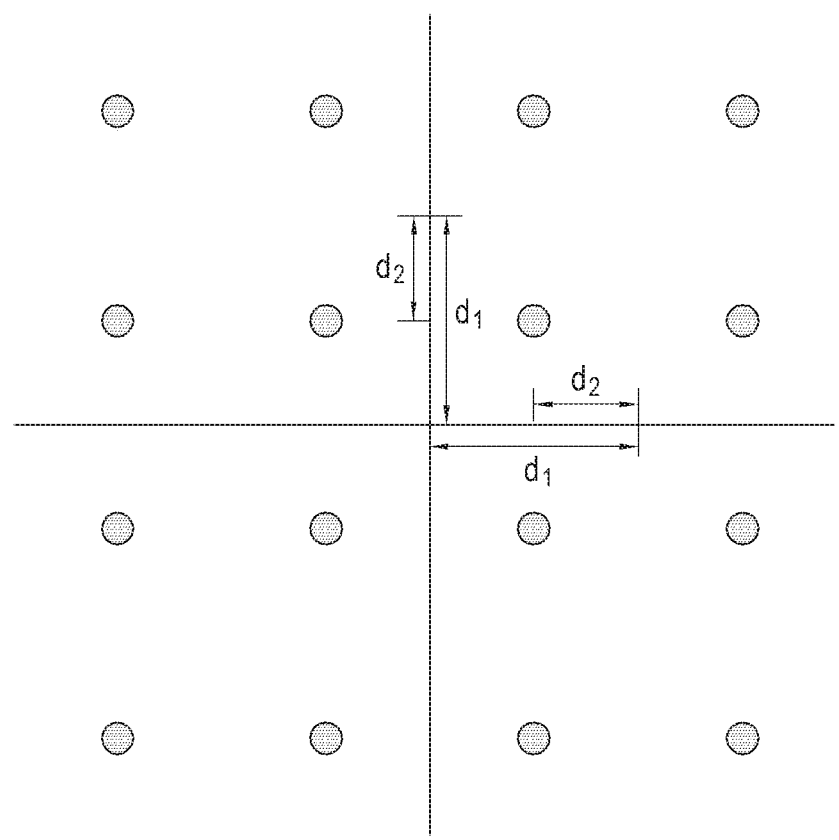

If p=1, an SCM signal constellation corresponding to FIG. 3A is identical to a typical 16-ary Quadrature Amplitude Modulation (16QAM) signal constellation.

As described above, according to various embodiments of the present disclosure, a modified 16-QAM signal constellation may be obtained by controlling an SCM coefficient p. According to various embodiments of the present disclosure, a different Quality of Service (QoS) level required for each layer may be supported flexibly using a modulation scheme that adopts the modified signal constellation.

Now, a brief description will be given of the concept of a decoding method in an SCM system.

Figure 4:
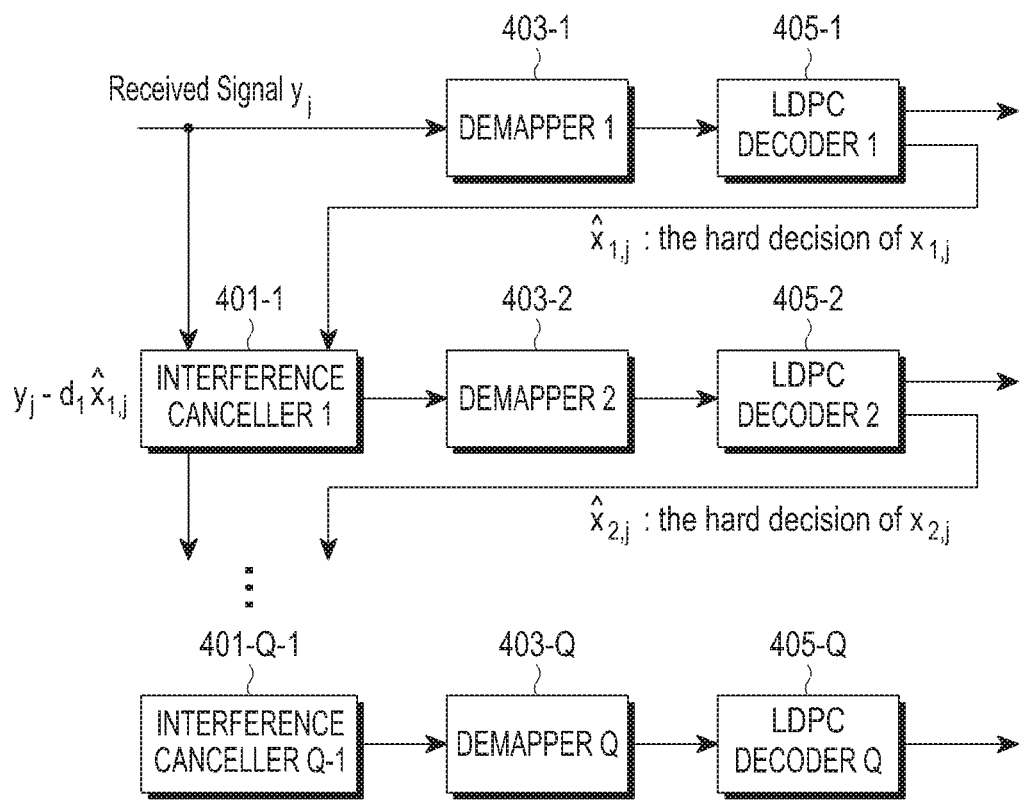
FIG. 4 is a block diagram of an SCM decoder according to an embodiment of the present disclosure.

FIG. 4 is a block diagram of an SCM decoder according to an embodiment of the present disclosure.

According to various embodiments of the present disclosure, an SCM coded symbol $s_j$ may be assumed to experience an Additive White Gaussian Noise (AWGN) channel. Accordingly, a received signal $y_j$ may be expressed as Equation 3.

$$y_j = s_j + n_j = \sum_{i=1}^{Q} d_i x_{i,j} + n_j \qquad \text{Equation 3}$$

where nj represents an AWGN noise sample.

According to various embodiments of the present disclosure, layers may be assumed to be indexed in a descending order of channel reliability in an SCM signal constellation. As an example, a first layer is assumed to have the highest channel reliability and a $Q^{th}$ layer is assumed to have lowest channel reliability. In this case, referring to FIG. 4, data of the first to $Q^{th}$ layers are recovered sequentially by (Q−1) interference cancellations through interference cancellers 401-1 to 401-Q−1 and Q LDPC decodings through LDPC decoders 405-1 to 405-Q.

The data recovery operation will be described below in greater detail.

For example, a first LDPC decoder (LDPC decoder 1) 405-1, a first demapper (demapper 1) 403-1, and a first interference canceller (interference canceller 1) 401-1 may be terminals, for example, portable terminals. In contrast, a second LDPC decoder (LDPC decoder 2) 405-2, a second demapper (demapper 2) 403-2, and a second interference canceller (interference canceller 2) 401-2 may be TVs.

Demapper 1 403-1 calculates an input value for decoding in LDPC decoder 1 405-1 in the first layer, from the received signal. The input value may be, for example, a Log Likelihood Ratio (LLR). Demapper 1 403-1 outputs the calculated input value to LDPC decoder 1 405-1. LDPC decoder 1 405-1 determines a hard-decision value of $x_{1,j}$ by LDPC decoding and outputs the determined value to interference canceller 1 401-1. Interference canceller 1 401-1 separates the determined value from the received signal $y_j$ using the hard-decision value $\hat{x}_{1,j}$ ($y_j - d_1 \hat{x}_{1,j}$). The value $y_j - d_1 \hat{x}_{1,j}$ is provided to demapper 2 403-1 in the second layer. Demapper 2 403-2 calculates an input value for decoding in LDPC decoder 2 405-2 and then transmits the calculated input value to LDPC decoder 2 405-2. LDPC decoder 2 405-2 performs LDPC decoding in the same manner as LDPC decoder 1 405-1. The demapping, LDPC decoding, and interference cancellation operations are repeated until the last layer. For example, these operations are repeated until LDPC decoding of the last layer is completed. While a plurality of independent processors may be implemented for each of demappers, LDPC decoders, and interference cancellers (up to Q demappers, up to Q LDPC decoders, and up to Q interference cancellers), a demapper, an LDPC decoder, and an interference canceller may be operated for each layer in a single processor because the layers are operated sequentially.

In successive interference cancellation, each layer generally has a different reliability and an error propagation effect occurs, in which an error generated in a previous layer is propagated to a current layer. For example, if the previous layer has an error, the error affects interference cancellation, thus affecting the performance of the current layer. Therefore, if the successive interference cancellation scheme is used as an SCM decoding scheme, the reliability of each layer needs to be controlled such that when the reliability of the previous layer is maximized, the current layer may be decoded.

To control the reliability of each layer, the coding rate of an LDPC code in each layer may be controlled or the SCM coefficients di described in Equation 1 may be controlled. Various embodiments of the present disclosure provides a method for supporting various Scalable Video Coding (SVC) schemes by controlling reliability using SCM coefficients, when each layer uses an LDPC code having the same coding rate.

According to various embodiments of the present disclosure, a noise threshold, a channel capacity, or a Signal to Noise Ratio (SNR) corresponding to the channel capacity is used to control the reliability of each layer.

A noise threshold is a minimum SNR that enables decoding without errors at a given coding rate and in a given modulation scheme. In general, once a channel code is determined, a noise threshold may be determined in many methods. The most popular method for obtaining a noise threshold is density evolution analysis.

The noise threshold varies with codes. Typically, the reliability of each layer is readily controlled using a channel capacity defined by Shannon. Because the noise threshold is almost close to a channel capacity or an SNR corresponding to the channel capacity of a well-designed code, controlling the reliability of each layer using a channel capacity or an SNR corresponding to the channel capacity may be preferable in many aspects.

The total channel capacity $C_{Total}$ of a system that adopts the SCM decoder illustrated in FIG. 4 in correspondence with the SCM encoder illustrated in FIG. 1 may be determined by Equation 4.

$$C_{Total} = h(y_j) - h(n_j) \qquad \text{Equation 4}$$

where a channel capacity unit is a dimension expressed as bps/Hz or bits/channel use.

Similarly, the channel capacity $C_i$ of each layer may be expressed as Equation 5.

$$C_i = h\left(y_j - \sum_{k=1}^{i-1} d_k x_{k,j}\right) - h\left(\sum_{k=i+1}^{Q} d_k x_{k,j} + n_j\right) \qquad \text{Equation 5}$$

where h(x) represents an entropy function of a random variable X, defined by Equation 6.

$$h(X) = -\int_{-\infty}^{\infty} p_X(a) \log_2 p_X(a) da \qquad \text{Equation 6}$$

where $p_X(a)$ represents a probability density function of X.

The use of Equation 6 enables prediction of the reliability of each layer based on a channel capacity or an SNR corresponding to the channel capacity, instead of a noise threshold.

It may be noted from Equation 6 that the channel capacities $C_i$ may vary with the values of the SCM coefficients $d_1$, $d_2$, ..., $d_Q$. For example, in the case in which SCM coefficients have a parameter p, $d_1 = \sqrt{4p^2/10}$ and $d_2 = \sqrt{(5-4p^2)/10}$ are applied to two independent QPSK signals $x_{1,j}$ and $x_{2,j}$ illustrated in FIGS. 2A and 2B, the channel capacity of each layer with respect to each p value is calculated as illustrated in FIGS. 5 and 6.

Figure 5:
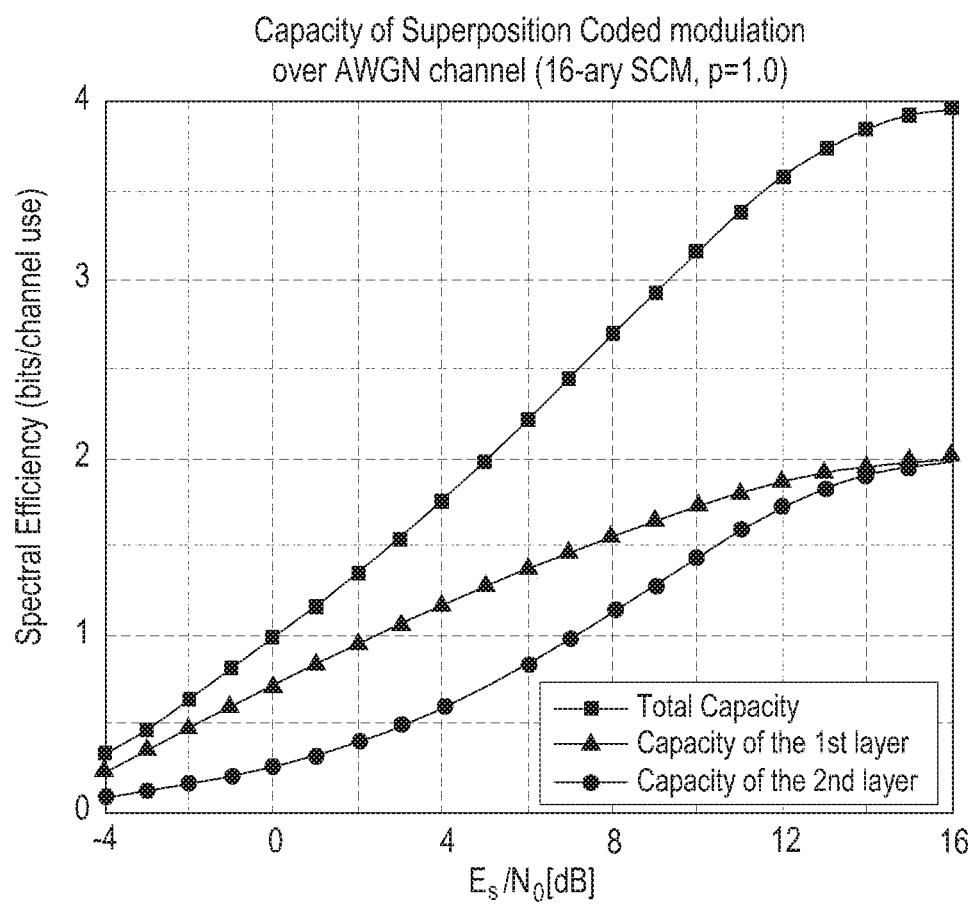
FIG. 5 is a graph illustrating a channel capacity of an SCM scheme having two independent layers, when p=1.0 according to an embodiment of the present disclosure.

FIG. 5 is a graph illustrating a channel capacity of an SCM scheme having two independent layers, when p=1.0 according to an embodiment of the present disclosure. FIG. 6 is a graph illustrating a channel capacity of an SCM scheme having two independent layers, when p=0.9 according to an embodiment of the present disclosure.

Figure 6:
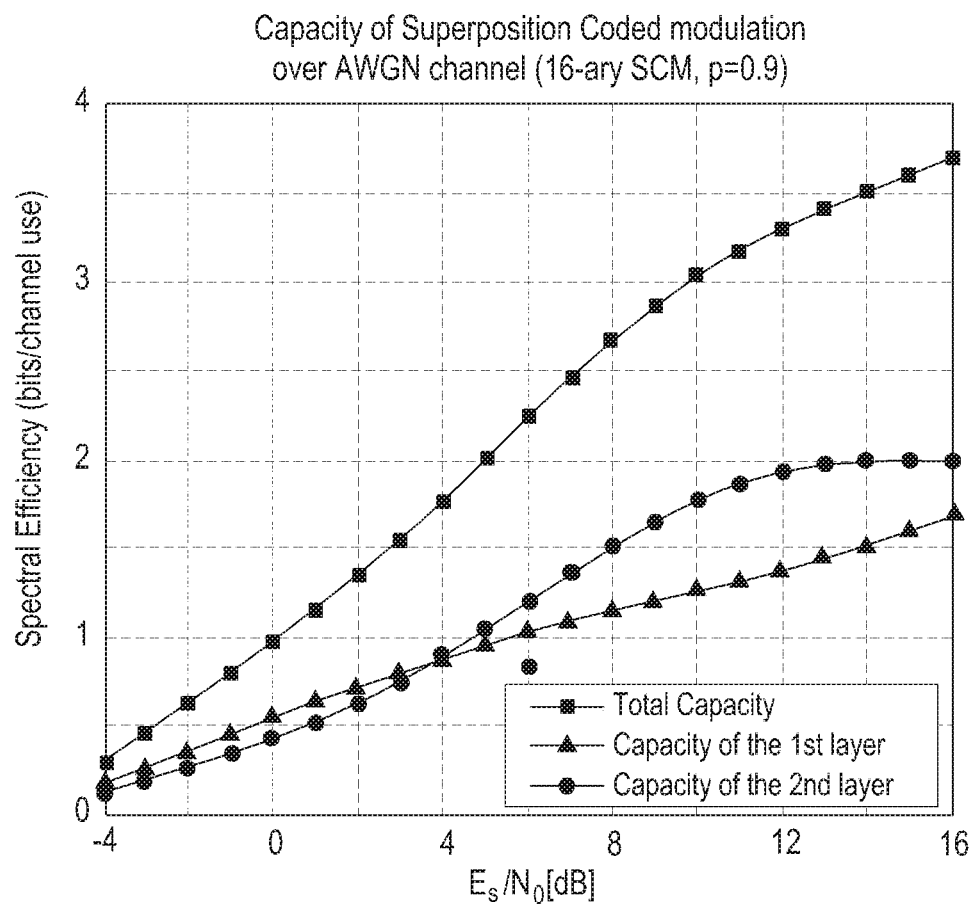
FIG. 6 is a graph illustrating a channel capacity of an SCM scheme having two independent layers, when p=0.9 according to an embodiment of the present disclosure.

Referring to FIGS. 5 and 6, as the value of p becomes smaller, the channel capacity of the first layer decreases and the channel capacity of the second layer increases. Particularly referring to FIG. 6, if p decreases in a high SNR area, the channel capacity of the second layer may exceed the channel capacity of the first layer (however, because the condition that $d_1 > d_2$ is generally satisfied, p is set to be larger than $\sqrt{5/8}$).

Because the channel capacity of each layer is changed by controlling the value of p as described above, various SVC schemes may be supported according to the purpose of each communication or broadcasting system.

Referring to FIG. 5, for example, if the SNR of an operation point is 4 dB in the communication or broadcasting system, the spectral efficiency of the first layer is about 1.2 and the spectral efficiency of the second layer is about 0.6. For example, the first and second layers have different spectral efficiencies. Therefore, a different amount of data should be transmitted in each layer.

In contrast, referring to FIG. 6, if the SNR of the operation point is 4 dB, the two layers have an equal spectral efficiency of about 0.9. Accordingly, the same amount of data may be transmitted in each layer.

Therefore, it is noted that the amount of data to be transmitted in each layer may be controlled easily by controlling the value of p according to an intended SVC scheme in a broadcasting or communication system.

A method for controlling the value of p according to an embodiment of the present disclosure will be described below.

Figure 7:
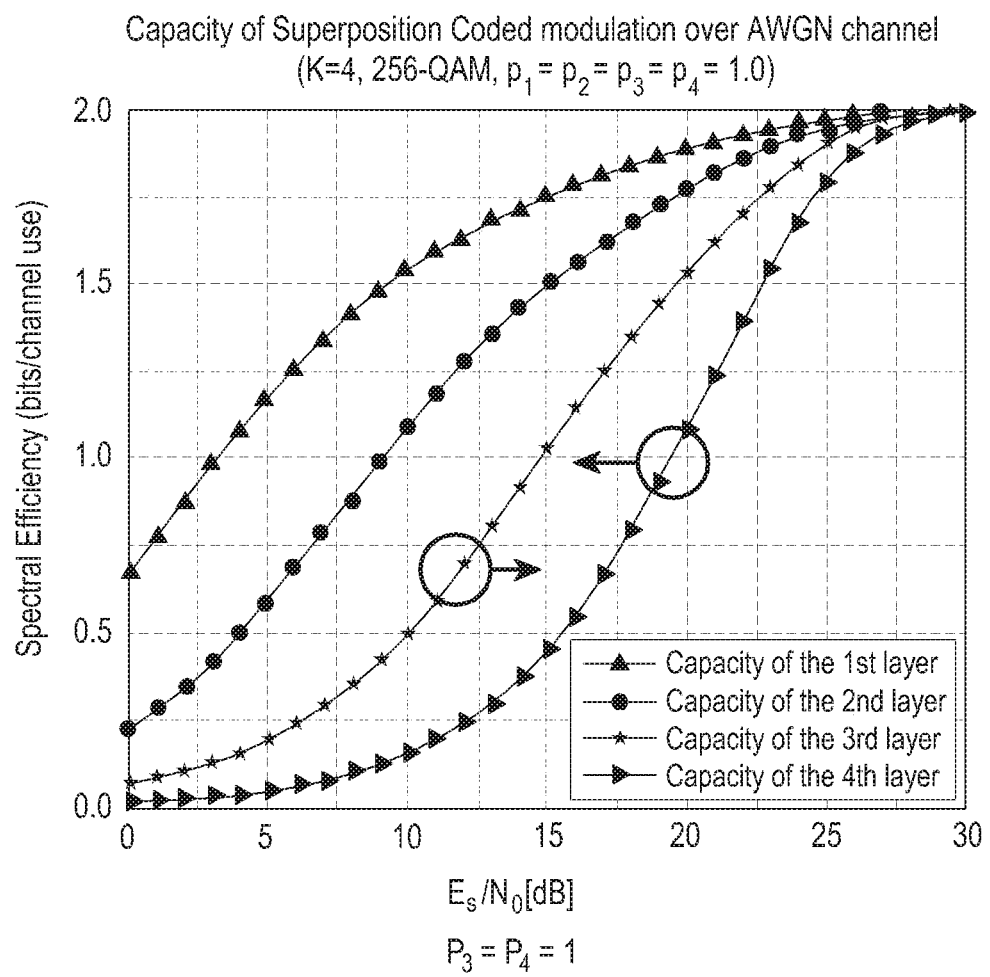
FIG. 7 is a graph illustrating a channel capacity of each layer, when 256-ary Quadrature Amplitude Modulation (256-QAM) is used and $p_1=p_2=p_3=p_4=1.0$ according to an embodiment of the present disclosure.
Figure 8:
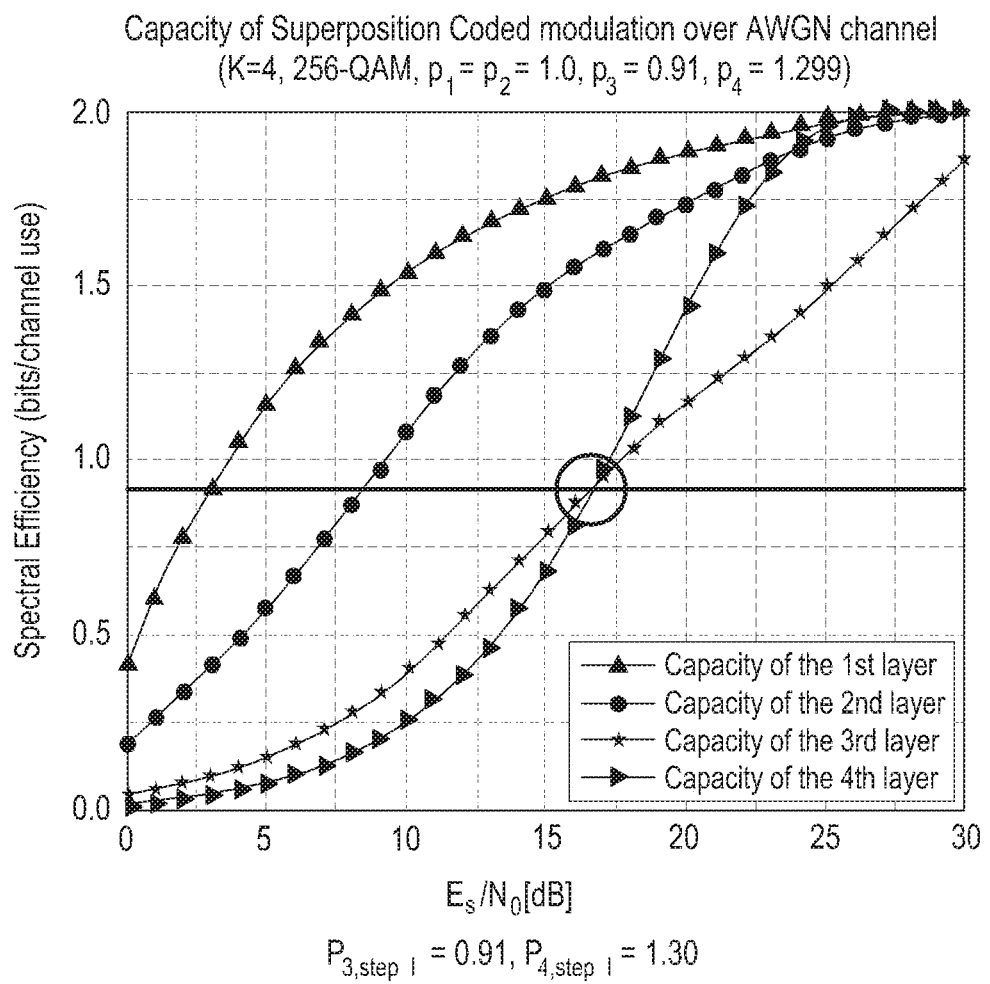
FIG. 8 is a graph illustrating a change in channel capacities of third and fourth layers, when 256-QAM is used according to an embodiment of the present disclosure.

FIG. 7 is a graph illustrating a channel capacity of each layer, when 256-ary Quadrature Amplitude Modulation (256-QAM) is used and p1=p2=p3=p4=1.0 according to an embodiment of the present disclosure. FIG. 8 is a graph illustrating a change in channel capacities of third and fourth layers, when 256-QAM is used according to an embodiment of the present disclosure.

First, it is assumed that there are 4 layers (Q=4) and each layer uses 256-QAM. If p1=p2=p3=p4=1.0, satisfying the constraint described in Equation 2, d1, d2, d3, and d4 may be expressed as Equation 7 so that an SCM scheme with the four layers combined may be identical to a typical 256-QAM scheme.

$$d_1 = \frac{8p_1}{\sqrt{85}}, \quad d_2 = \frac{4p_2}{\sqrt{85}}, \quad d_3 = \frac{2p_3}{\sqrt{85}}, \quad d_4 = \frac{p_4}{\sqrt{85}} \qquad \text{Equation 7}$$

$$(64p_1^2 + 16p_2^2 + 4p_3^2 + p_4^2 = 85)$$

When p1=p2=p3=p4=1.0, satisfying Equation 7, the channel capacity of each layer is illustrated in FIG. 7. Referring to FIG. 7, it is noted that the layers have conspicuously different channel capacities with respect to SNRs. For example, the first and second layers require SNRs of about 3 dB and 19 dB, respectively with a big difference of about 16 dB between them to provide the same spectral efficiency of 1.0.

A description will be given of a method for controlling SCM coefficients, when the same data is to be transmitted in each layer.

On the assumption that the first and second layers are perfectly decoded, the reliabilities of the third and fourth layers are determined by p3 and p4. Once the coding rate of an LDPC code to be used in the third and fourth layers are determined, p3 and p4 are determined so that the difference between noise thresholds of the third and fourth layers or the difference between SNRs corresponding to channel capacities of the third and fourth layers is less than 0.5 dB, while changing p3 under the constraint of Equation 8.

$$p_4 = \sqrt{5 - 4p_3^2} \qquad \text{Equation 8}$$

For example, if the coding rate of an LDPC code to be used in the third and fourth layers is determined to be 4/9, the theoretical spectral efficiency is 8/9. As illustrated in FIG. 8, the channel capacity curves of the third and fourth layers are set to pass through the spectral efficiency of 8/9 by controlling p3 to 0.91.

The reason for setting the difference between SNRs corresponding to channel capacities to about 0.5 dB is that in the presence of a plurality of layers, the reliability of a first decoded layer should be higher than that of a next decoded layer in order to reduce the error propagation effect, as described before. In other words, the noise threshold of the first decoded layer should be lower than that of the next decoded layer. This means that the channel capacity of the first decoded layer should be higher than that of the next decoded layer. Although a difference of about 0.5 dB is set between SNRs corresponding to channel capacities in the embodiment of the present disclosure, the difference may be changed appropriately under circumstances.

Figure 9:
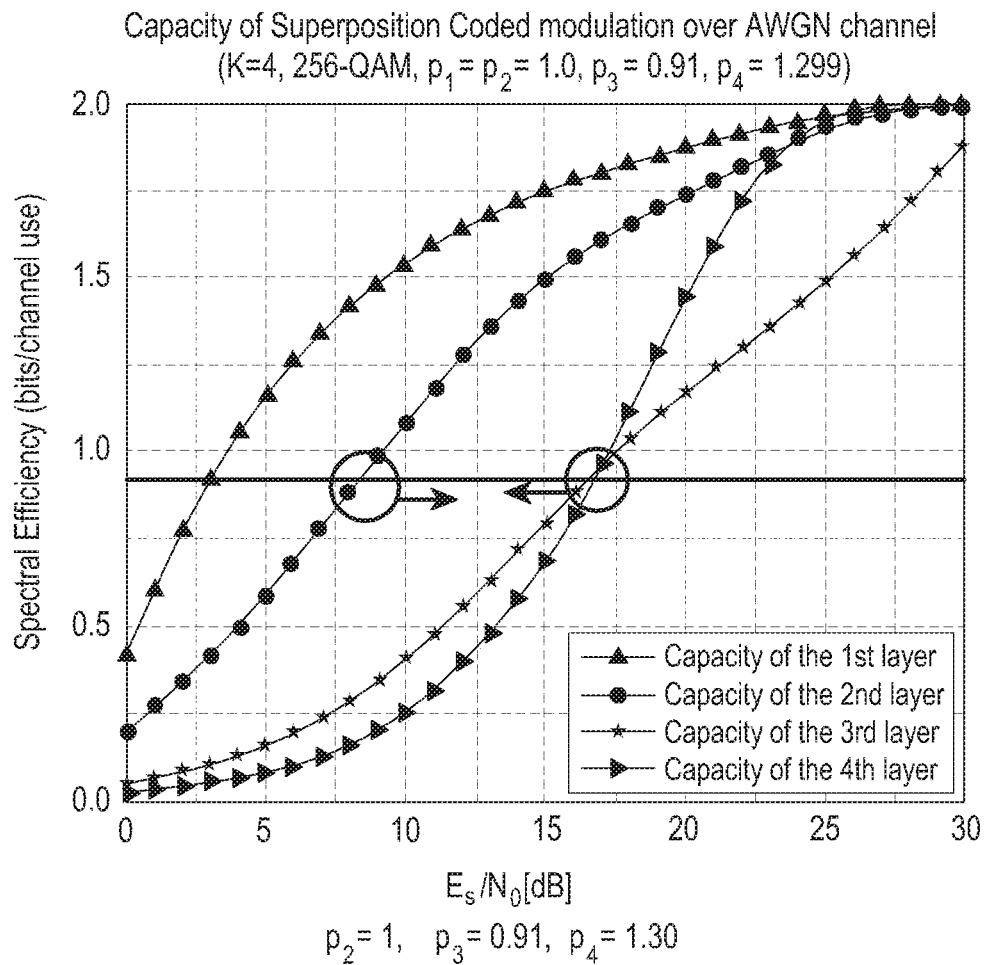
FIG. 9 is a graph illustrating a change in channel capacities of second, third, and fourth layers according to an embodiment of the present disclosure.
Figure 10:
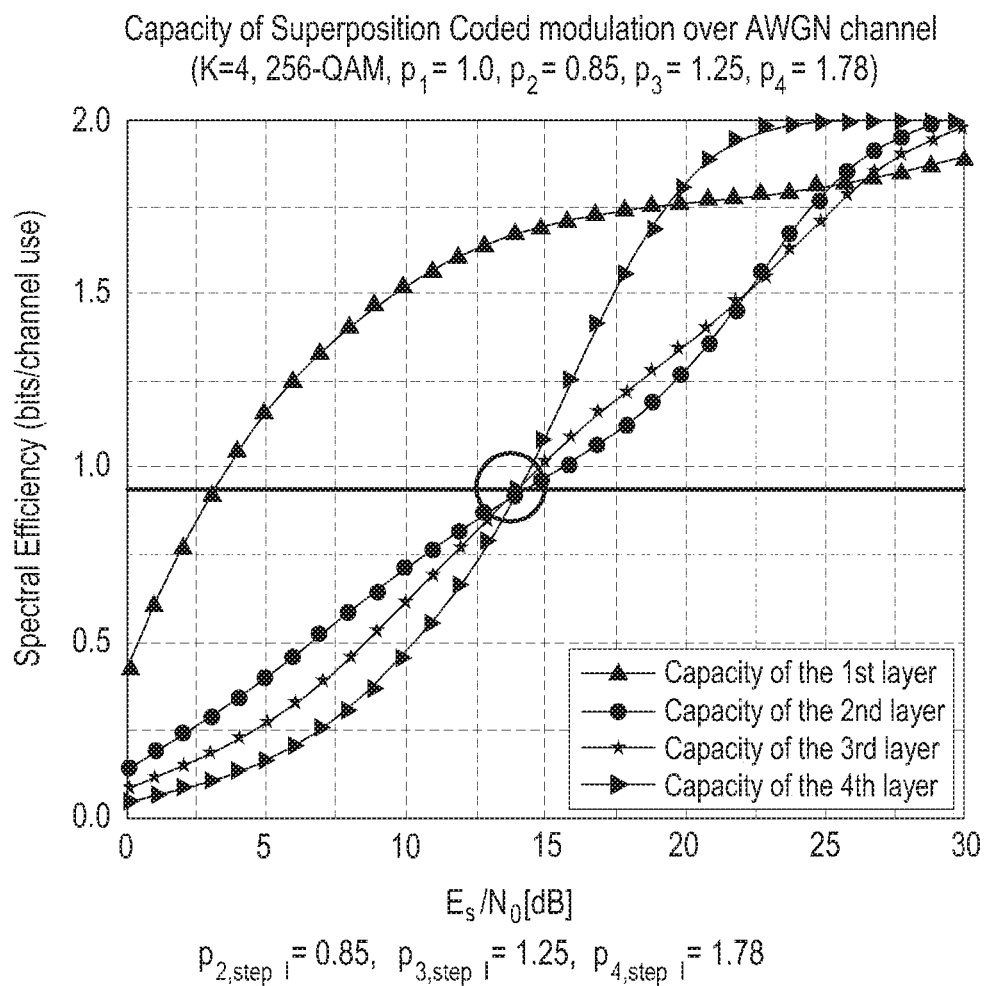
FIG. 10 is a graph illustrating a change in channel capacities of second, third, and fourth layers according to an embodiment of the present disclosure.

FIG. 9 is a graph illustrating a change in channel capacities of second, third, and fourth layers according to an embodiment of the present disclosure. FIG. 10 is a graph illustrating a change in channel capacities of second, third, and fourth layers according to an embodiment of the present disclosure.

New values of p3 and p4 detected in the foregoing description are assumed to be p3'=0.91 and p4'=1.3, respectively. Now, values of p2, p3, and p4 are detected so that the difference between SNRs corresponding to channel capacities of the second and third layers is less than 0.5 dB, while changing p2 as illustrated in FIGS. 9 and 10 under the constraint expressed as Equation 9.

$$p_3 = p_3'\sqrt{\frac{21 - 16p_2^2}{5}}, \quad p_4 = p_4'\sqrt{\frac{21 - 16p_2^2}{5}} \qquad \text{Equation 9}$$

If p3 and p4 are controlled under the condition of Equation 8, p2 may be controlled without a change in the average power of a transmission signal, while maintaining a ratio between p3 and p4 detected in a previous operation. If the ratio between p3 and p4 is maintained, the difference between the channel capacities (or noise thresholds) of the third and fourth layers is not changed much even though p2 is controlled. Optimum p2, p3, and p4 detected in this manner are assumed to be p2"=0.85, p3"=1.25, and p4"=1.78, respectively.

Figure 11:
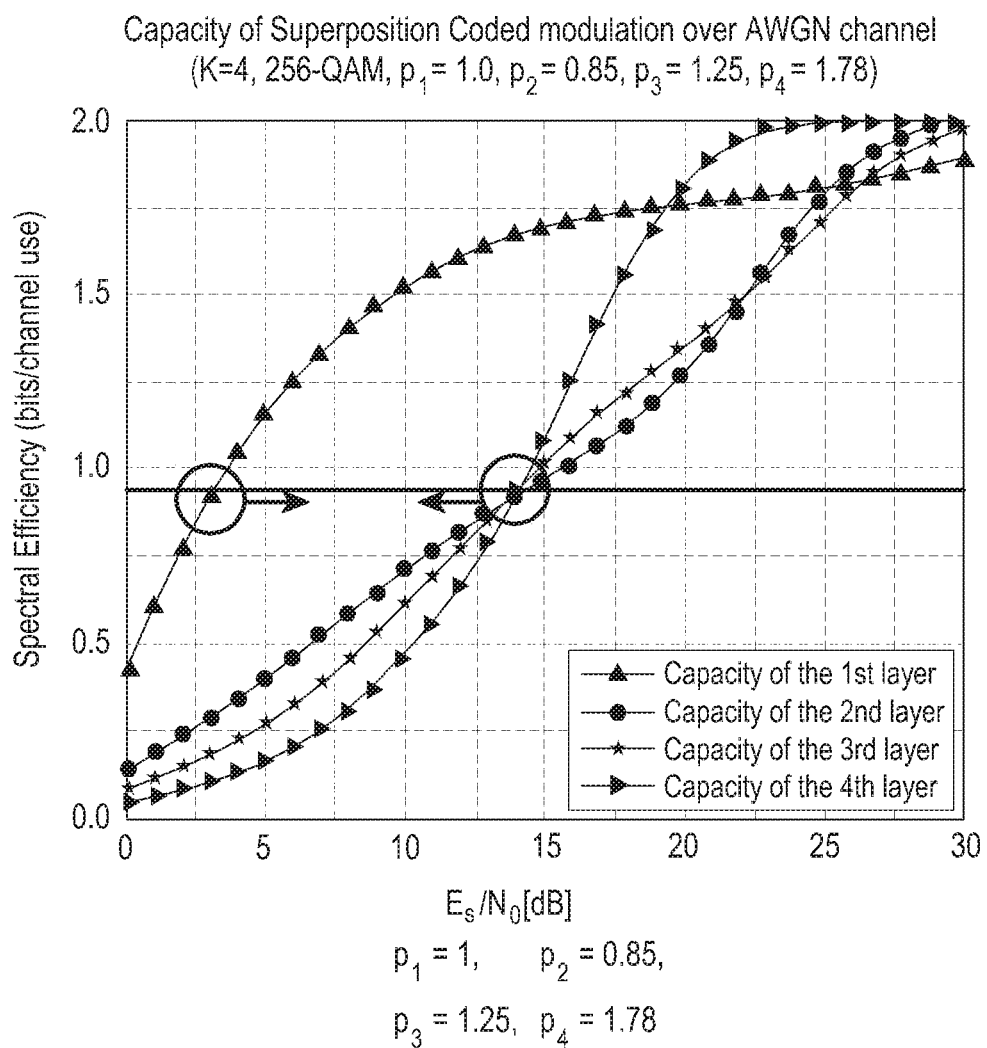
FIGS. 11 and 12 are graphs illustrating a change in channel capacities of first, second, third, and fourth layers according to an embodiment of the present disclosure.
Figure 12:
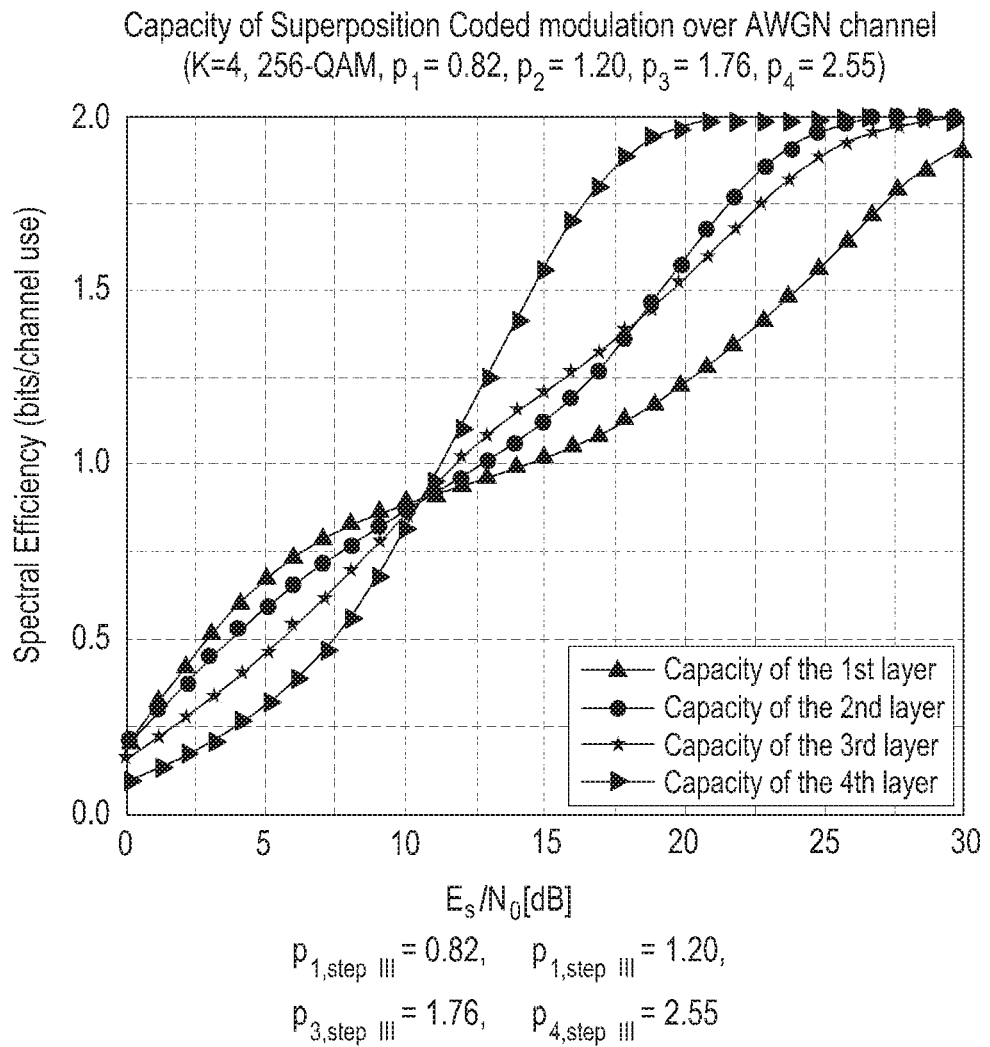

FIGS. 11 and 12 are graphs illustrating a change in channel capacities of first, second, third, and fourth layers according to an embodiment of the present disclosure.

FIG. 11 illustrates the channel capacity curve of each layer under the condition that 256-QAM is used, $p_1$=1.0, $p_2$=0.85, $p_3$=1.25, and $p_4$=1.7, and FIG. 12 illustrates the channel capacity curve of each layer under the condition that there are four layers, 256-QAM is used, $p_1=0.82$, $p_2=1.20$, $p_3=1.76$, and $p_4=2.55$.

Finally, values of p1, p2, p3, and p4 are detected for use as final SCM coefficients so that the difference between SNRs corresponding to channel capacities of the first and second layers is less than 0.5 dB, while changing p1 as illustrated in FIGS. 11 and 12 under the constraint expressed as Equation 10]

$$p_2 = p'_2 \sqrt{\frac{85 - 64p_1^2}{21}},$$

$$p_3 = p'_3 \sqrt{\frac{85 - 64p_1^2}{21}},$$

$$p_4 = p'_4 \sqrt{\frac{85 - 64p_1^2}{21}}$$

Equation 10

SCM coefficients detected under the constraints of Equation 7 to Equation 10 keep the difference between SNRs corresponding to channel capacities of layers within 0.5 dB, irrespective of the coding rate of an LDPC code used in each layer. In addition, because the SNR corresponding to a channel capacity of each layer may be controlled using only one variable, a signal constellation satisfying an intended channel capacity for each layer may be designed simply even though the number of layers is increased.

Figure 13:
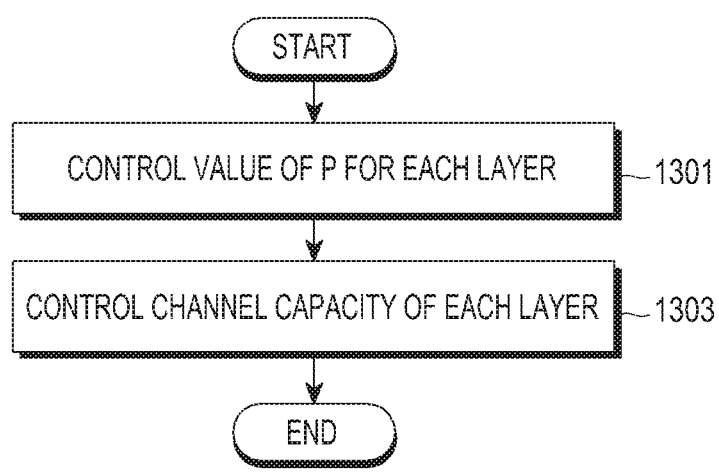
FIG. 13 is a flowchart illustrating a Scalable Video Coding (SVC) method in a broadcasting or communication system according to an embodiment of the present disclosure.

FIG. 13 is a flowchart illustrating an SVC method in a broadcasting or communication system according to an embodiment of the present disclosure.

Referring to FIG. 13, a receiver controls a power coefficient p for each layer at operation 1301. As a result, the channel capacity of each layer or an SNR corresponding to the channel capacity of each layer is changed. For example, at operation 1303, the channel capacity of each layer may be controlled. As illustrated in FIGS. 8, 10, and 12, the channel capacities and/or the SNRs corresponding to the channel capacities of layers become equal at a certain point. In an implementable example, the channel capacity of each layer or the SNR corresponding to the channel capacity may be changed by controlling a coding rate.

Table 1 below lists the results of various embodiments of the present disclosure for obtaining optimized SCM coefficients, when the coding rate of each layer is changed. The left four columns represent the coding rates of the respective layers.

It is noted from the rightmost column of Table 1 that an actual noise threshold (or an SNR corresponding to a channel capacity) increases from one layer to another layer, but is almost the same across the layers (within a difference of 0.5 dB).

Figure 14:
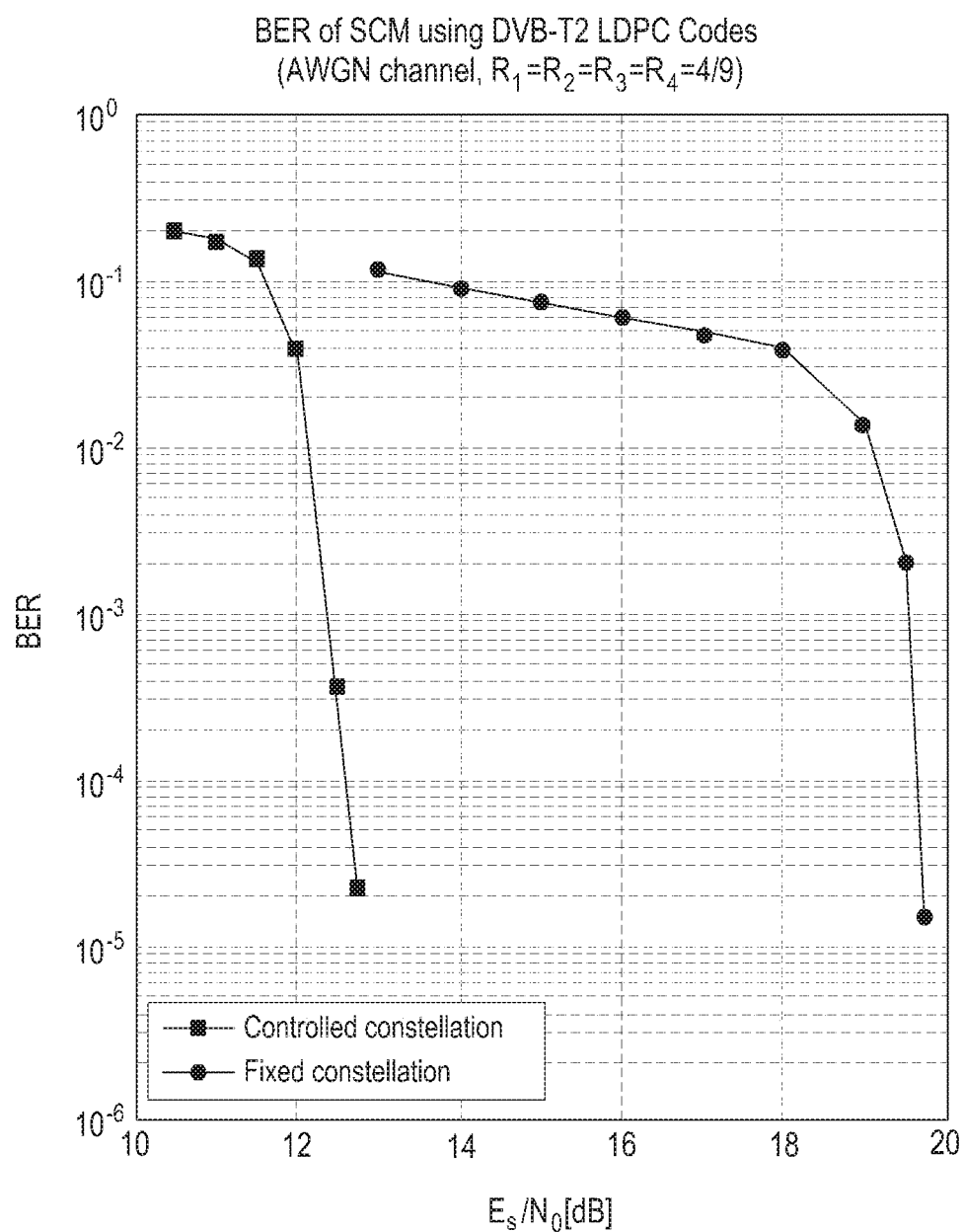
FIG. 14 is a graph illustrating improved performance of an SCM scheme according to an embodiment of the present disclosure.

FIG. 14 is a graph illustrating improved performance of an SCM scheme according to an embodiment of the present disclosure.

Referring to FIG. 14, it is noted that compared to a conventional SCM scheme using a fixed 256-QAM signal constellation, the SCM scheme according to various embodiments of the present disclosure can achieve a great performance gain of about 7 dB at a point at which a Bit Error Rate (BER) is 10-5.

As is apparent from the above description, various embodiments of the present disclosure can implement an SVC scheme efficiently using an SCM scheme in a broadcasting or communication system.

Various embodiments of the present disclosure can maximize the performance of each layer in a broadcasting or communication system, if an SCM scheme is used and the coding rate of each layer is determined in the SCM scheme.

Various embodiments of the present disclosure can maximize the performance by controlling the value of a parameter p in a broadcasting or communication system.

Various embodiments of the present disclosure can flexibly support different QoS requirements of layers using a modulation scheme based on a modified signal constellation.

The proposed method and apparatus according to various embodiments of the present disclosure for performing an SCM scheme in a broadcasting or communication system may be implemented as computer-readable code in a non-transitory computer-readable recording medium. The non-transitory computer-readable recording medium may include any kind of recording device storing computer-readable data. Examples of the recording medium may include Read Only Memory (ROM), Random Access Memory (RAM), optical disk, magnetic tape, floppy disk, hard disk, non-volatile memory, and the like, and may also include the medium that is implemented in the form of carrier waves (e.g., transmission over the Internet). In addition, the non-transitory computer-readable recording medium may be distributed over the computer systems connected over the network, and computer-readable codes may be stored and executed in a distributed manner.

Although the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for receiving a signal, the method comprising:

receiving a superposition-coded modulation (SCM) signal with a noise signal;

TABLE 1

| 1st layer | 2nd layer | 3rd layer | 4th layer | Signal constellation parameters: $p_1/p_2/p_3/p_4$ | Noise Threshold [dB]: $1^{st}/2^{nd}/3^{rd}/4^{th}$ layer |
|---|---|---|---|---|---|
| 1/3 | 1/3 | 1/3 | 1/3 | 0.77/1.21/1.91/2.99 | 7.12/7.22/7.38/7.50 |
| 2/5 | 2/5 | 2/5 | 2/5 | 0.80/1.21/1.82/2.73 | 9.04/9.12/9.24/9.35 |
| 4/9 | 4/9 | 4/9 | 4/9 | 0.82/1.20/1.76/2.55 | 10.18/10.35/10.44/10.60 |
| 3/5 | 3/5 | 3/5 | 3/5 | 0.89/1.16/1.54/1.98 | 14.19/14.59/14.61/14.84 |
| 2/3 | 2/3 | 2/3 | 2/3 | 0.91/1.14/1.42/1.76 | 16.09/16.26/16.63/16.68 |
| 11/15 | 11/15 | 11/15 | 11/15 | 0.93/1.12/1.32/1.55 | 18.03/18.28/18.36/18.66 |
| 7/9 | 7/9 | 7/9 | 7/9 | 0.94/1.10/1.26/1.46 | 19.65/19.74/19.75/19.97 |
| 8/9 | 8/9 | 8/9 | 8/9 | 0.98/1.03/1.10/1.21 | 22.53/22.87/23.15/23.22 | de-mapping the SCM signal with the noise signal to generate first values corresponding to a first layer signal;

decoding and mapping the first values based on a low density parity check (LDPC) code to determine constellation points corresponding to the first layer signal;

determining a second layer signal of the SCM signal based on the constellation points and the SCM signal with the noise signal;

de-mapping the second layer signal to generate second values corresponding to the second layer signal; and decoding the second values based on the LDPC code to determine information bits corresponding to the second layer signal, wherein the SCM signal is determined based on a SCM coefficient, the first layer signal and the second layer signal at a transmitter, wherein the SCM coefficient is used to control a transmission power ratio between a total power and a power corresponding to the first layer, or between the total power and a power corresponding to the second layer, and wherein a quality of services (QoS) level of the first layer is different from a QoS level of the second layer.

2. The method of claim 1, wherein a coding rate of the first layer is different from a coding rate of the second layer, or wherein a modulation scheme of the first layer is different from a modulation scheme of the second layer.

3. The method of claim 1, wherein the first values are determined based on log-likelihood ratios (LLRs) corresponding to the SCM signal with the noise signal, and wherein the second values are determined based on LLRs corresponding to the second layer signal.

* * * * *